May 6, 1924.

G. A. LEIMAN 1,493,044

MACHINE FOR MAKING GLASS ARTICLES

Filed May 8, 1920     3 Sheets-Sheet 1

Inventor:
Gustave A. Leiman
by attorneys

May 6, 1924.

G. A. LEIMAN 1,493,044

MACHINE FOR MAKING GLASS ARTICLES

Filed May 8, 1920   3 Sheets-Sheet 2

Inventor:
Gustav A. Leiman
by attorneys

May 6, 1924.

G. A. LEIMAN

MACHINE FOR MAKING GLASS ARTICLES

Filed May 8, 1920

Inventor:
Gustav A. Leiman
by Attorney

Patented May 6, 1924.

1,493,044

UNITED STATES PATENT OFFICE.

GUSTAVE A. LEIMAN, OF NEW YORK, N. Y.

MACHINE FOR MAKING GLASS ARTICLES.

Application filed May 8, 1920. Serial No. 379,808.

*To all whom it may concern:*

Be it known that I, GUSTAVE A. LEIMAN, a citizen of the United States, and resident of the borough of the Bronx, in the city and State of New York, have invented a new and useful Improvement in Machines for Making Glass Articles, of which the following is a specification.

This invention relates to a machine for making glass articles, such as beads, buttons and the like, from canes, rods or sticks of glass, and has for its object to provide a machine which is constructed to automatically control the progressive operations through which the material for making the articles is passed.

Another object is to provide a machine which will be simple, durable and effective.

A still further object is to provide certain improvements in the form, construction and arrangement of the parts whereby the above named and other objects may be effectively carried out.

A practical embodiment of my invention is represented in the accompanying drawings, in which—

Figure 1:
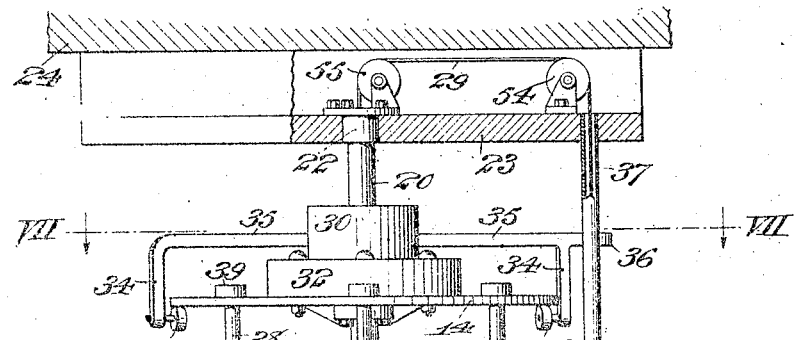
Fig. 1 represents a front elevation of my improved machine having certain parts broken away to more clearly show other parts beyond.
Figure 2:
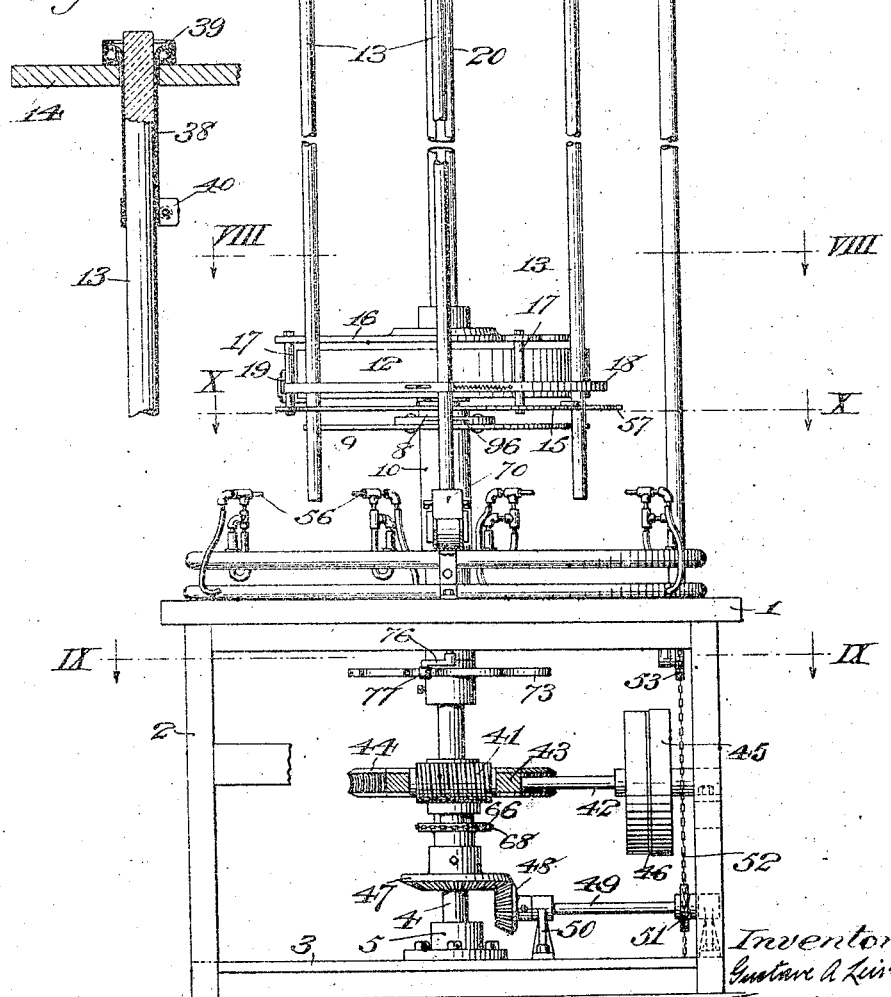
Fig. 2 represents a detail section, on an enlarged scale, of the glass cane holder.

The machine is supported upon a table 1 mounted on a frame 2 having a shelf 3 arranged near the bottom of the frame in position to receive the driving mechanism to be hereinafter described.

A vertical shaft 4 is stepped in a bearing 5 carried by the shelf 3 and journaled in bearings 6, 7 secured to the table 1. The upper end of the shaft 4 is provided with a bearing 8 fixed on a plate 9 and supported by a tubular member 10, which member is secured to the bearing 7.

A friction driving wheel 11 is keyed to the upper end of the shaft 4, the surface of which wheel is provided with a yielding element 12, such as canvas, cloth or other suitable material, for receiving the glass canes 13 to be worked.

The glass canes 13 are carried in a vertically movable and horizontally rotatable carrier which comprises an upper plate 14, a lower plate 15 and an intermediate plate 16. The intermediate plate 16 is spaced from and secured to the lower plate 15 by means of posts 17. The lower plate 15 is located between the driving wheel 11 and the bearing 8.

A yielding band 18 is held in position between the intermediate and lower plates by straps 19 secured to the post 17, to engage the canes 13 and hold them in intimate contact with the driving wheel 11 and by which means the carrier receives its rotary motion.

The upper plate 14 is arranged to slide vertically on a hollow shaft 20, one end of which shaft is secured in a hub 21 of the intermediate plate 16 and the other end journaled in a bearing 22 carried in a platform 23 depending from a support 24.

The plate 14 is rotated by means of a key 25 secured thereto by a bolt 26, which key passes through a slot 27 in the hollow shaft 20 and is provided with a swivel 28 and a flexible connection 29 which controls the vertical movement of the plate. Thus, it will be seen that the plate receives its rotary motion from the shaft 20 through the intermediate plate 16 and may at the same time be given a vertical motion by the flexible connection 29.

To provide a firm bearing for the rotation of the plate 14, a block 30 is mounted to slide on the shaft 20 and has an annular groove 31 arranged to receive an annular gib 32, secured to the plate 14. The outer edge of the plate is supported on rollers 33 carried by arms 34 to the hangers 35, which are secured to the block 30. One of the hangers 35 is provided with an extension 36 which engages a pipe 37 extending from the table 1 to the platform 23, to prevent the block 30 from rotating with the plate 14.

The canes 13 are each held in a sleeve 38, of an anti-friction bearing 39 carried by the plate 14, by means of a clamp 40 on the sleeve.

In the present instance I have shown a plate arranged to receive six bearings with the canes spaced equidistant.

Motion is imparted to the shaft 4 by a worm 41 fast on a shaft 42 carried in brackets 43 on the frame 2, which worm meshes with a worm wheel 44 fixed on the shaft 4. The shaft 42 is driven, in the present instance, by a belt 45 and pulley 46 on the shaft from a source of power (not shown).

The vertical movement of the plate 14 is controlled relatively to the rotary movement of the same by a bevel gear 47 on shaft 4 which bevel gear meshes with a bevel gear 48 carried by a shaft 49 mounted in brackets 50 on the shelf 3. A sprocket 51 on the shaft 49 is arranged to receive a sprocket chain 52 one end of which passes upwardly from the pipe 37 and is coupled to the flexible connection 29. The other end of the chain is carried over an idler sprocket 53 and downwardly towards the shelf 3 where it may rest until brought into use. The flexible connection 29 is maintained centrally to the pipe 37, by a guide pulley 54 located in position on the platform 23. A similar pulley 55 is also arranged on the platform 23 to direct the flexible connection from the swivel 28 in the hollow shaft 20 to the pulley 54.

The canes 13 extend below the plate 15 a sufficient distance to be brought into and out of the path of a series of flames issuing from the burners 56 arranged in position on the table 1. The construction and operation of the burners may be of any well-known and improved form and serve no purpose in this invention other than herein specified.

In order that the canes 13 may be brought to the desired position, I provide the lower plate 15 with a series of projections 57, the number corresponding to the number of canes carried by the plate 14, in the present instance six are shown, which projections are adapted to engage the swinging stop lever 58 pivoted in a bracket 59 on the shelf 3, which stop lever is arranged to be oscillated by means of a cam 60 fixed on a vertical shaft 61 which is mounted to rotate in a bearing 62 on the table 1 and stepped in a bearing 63 on the shelf. This cam 60 is arranged to move the stop lever 58 out of engagement with the projection 57 after each operation on the cane has been performed. The stop lever 58 is horizontally brought into the path of the projection 57 by a spring 64, one end of which is secured to a pin 65 depending from the table 1 and the other end to the stop lever 58.

Motion is imparted to the shaft 61 from the shaft 4 by means of sprockets 66, 67, connected by a chain 68.

The plurality of molds, in the present instance three, are located on the table 1 between the burners and in position to engage the lower ends of the canes 13. Each mold comprises movable members 69, 70 arranged to slide on horizontally disposed rods 71* carried by a base 71, which is supported from the table 1 by brackets 72. The members 69, 70 are moved simultaneously by means of a cam 73 fixed on the shaft 4, which cam rocks a vertically disposed shaft 74, the lower end of which is journaled in a bearing 75 in the table 1, through an arm 76 fast on the lower end of the shaft and having a truck roller 77 which engages the cam 73. This roller 77 is held against the face of the cam 73 by a spring 78 which is interposed between an arm 79 on the shaft 74 and a pin 80 on the table. The upper end of the shaft 74 is journaled in a lug 81 projecting from the base 71 and provided with oppositely disposed arms 82, 83, of which the arm 82 is connected to the member 70 by a link 84 and the arm 83 connected to the member 69 by a link 85, so that as the shaft 74 is rocked, the arms 82, 83, will move the members 70, 69 in opposite directions through the links 84, 85.

Figures 3, 4, 5, 6:
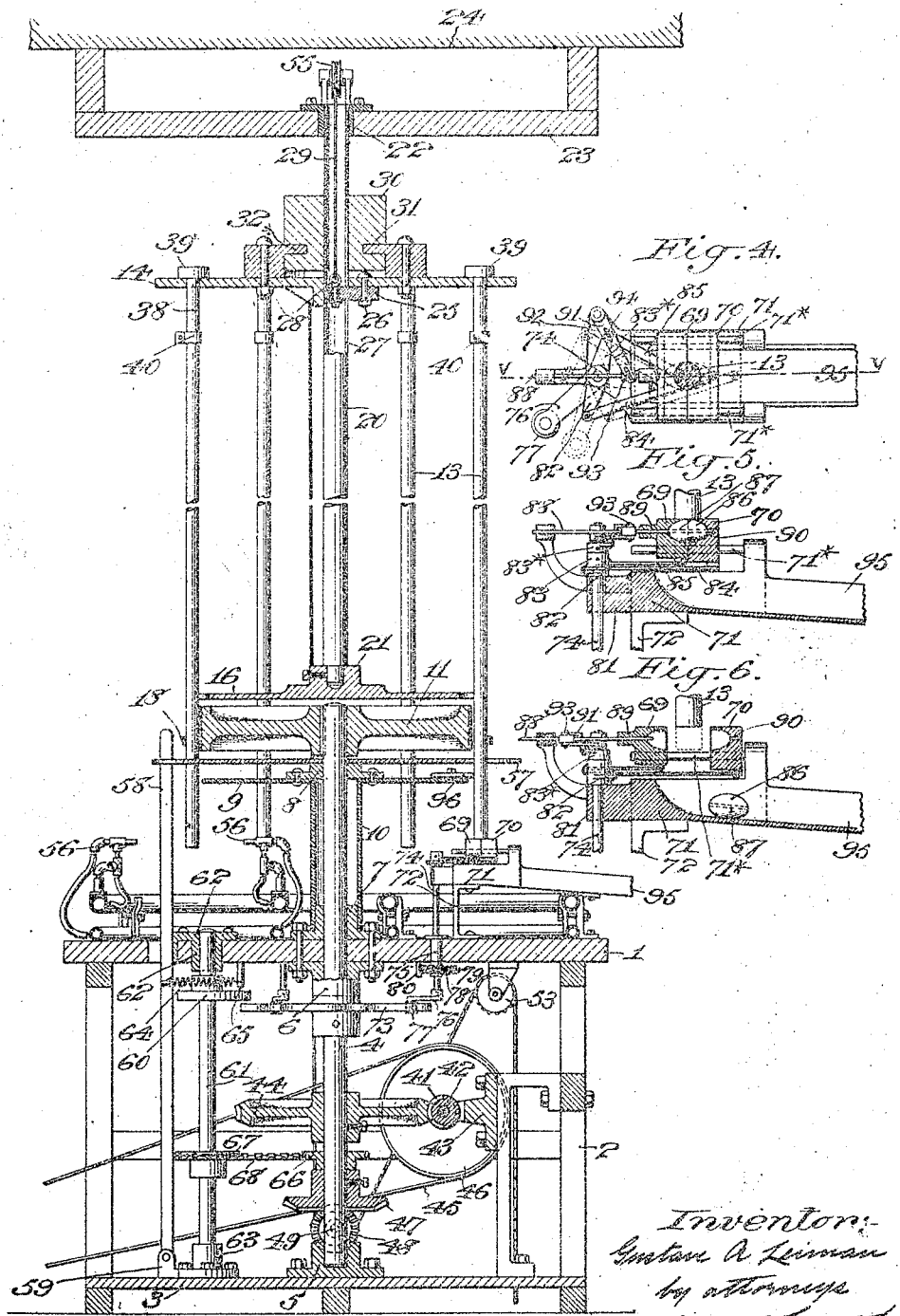
Fig. 3 represents a longitudinal central section taken from front to rear of the machine, on the same scale as Fig. 1.
Fig. 4 represents a detail of the article forming mechanism, on an enlarged scale.
Fig. 5 represents a vertical section taken in the plane of the line V—V of Fig. 4, looking in the direction of the arrows.
Fig. 6 represents a similar view with the parts in another position.
Figure 7:
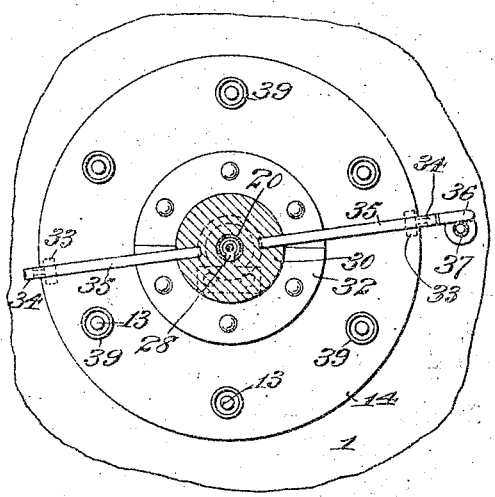
Fig. 7 represents a horizontal section taken in the plane of the line VII—VII of Fig. 1, looking in the direction of the arrows.
Figure 8:
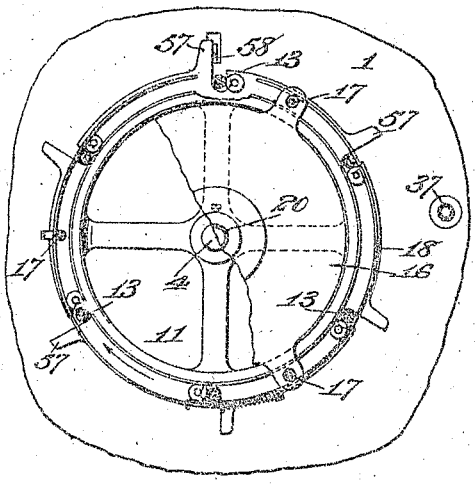
Fig. 8 represents a horizontal section taken in the plane of the line VIII—VIII of Fig. 1, looking in the direction of the arrows.
Figure 9:
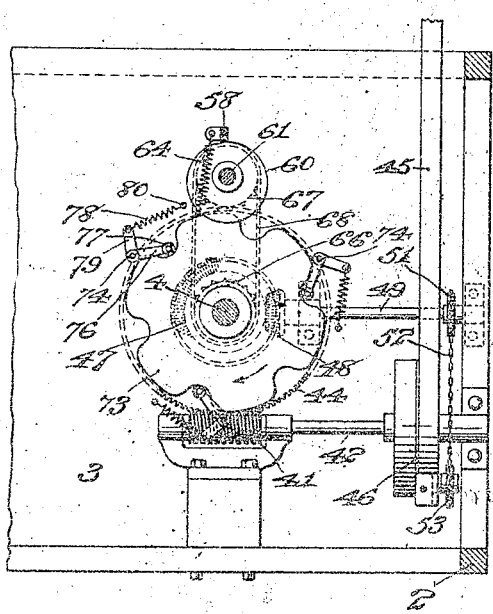
Fig. 9 represents a horizontal section taken in the plane of the line IX—IX of Fig. 1, looking in the direction of the arrows.
Figure 10:
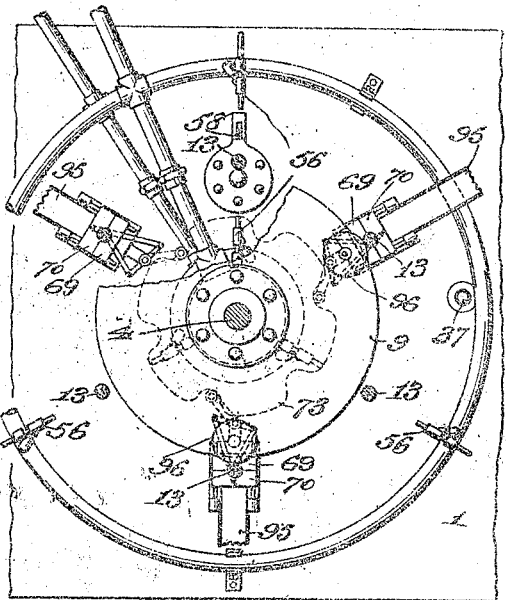
Fig. 10 represents a horizontal section taken in the plane of the line X—X of Fig. 1, looking in the direction of the arrows.

In this particular form I have shown molds suitable for forming beads 86 each of which are provided with a central hole 87 as shown in Figures 4, 5 and 6. This hole 87 in the bead is formed by means of a pin 88 which is arranged to slide in bearings 89, 90 in the members 69, 70, and actuated from the vertically disposed shaft 74 by means of an oscillating arm 91 pivoted on a bracket 92 extending laterally from the base 71. The arm 91 connects with the pin 88 at 93 and is oscillated by an arm 83* fast on the shaft 74, through a pin and slot connection 94. In order that the articles formed by the molds may be collected, I provided the base 71 with a downwardly and outwardly disposed trough 95 into which trough the articles may fall from the molds and be conveyed away from the machine.

In providing the carrier with six canes which are brought into contact with the three molds, I am enabled to form a set of three articles and simultaneously with the forming of the articles the adjacent canes are being heated by the flames of the burners 56. Thus, it will be seen that the canes are heated by the flames of the burners passed to the molds and from the molds progressively into the flames of the burners. While the canes are being heated they are rotated upon their own axes by contact with the driving wheel 11, so that the flame from the burners will attack the cane uniformly and cause the lower end of the cane to become plastic. When the canes are passing from the burners to the molds, they are held between the yielding element 12 on the driving wheel 11 and the band 18, which condition causes the canes to be revolved with the driving wheel 11.

When each cane is brought into position to be operated on by the mold, the rotation of the cane is stopped by means of a roller 96 mounted on the plate 9 so that the periphery of the roller will engage the cane and hold it out of contact with the wheel 11, throughout the molding operation.

While passing from the molds to the burners the carrier is automatically moved downwardly to keep the lower end of the canes in the path of the flames of the burners and to compensate for the portion removed therefrom by the molds.

The different stages through which each cane passes may be termed a unit and as each cane is passed progressively I will only describe the operation with respect to one cane.

In operation: Assuming the shaft 4 and the driving wheel 11 are driven at a constant speed through the driving connection and the cane 13 held to the surface 12 of the wheel by the yielding band 18, the cane will be caused to rotate in its bearings 39, at the surface speed of the wheel 11. The cane will continue to rotate about its axis until the cam 60 engages the stop lever 58 and moves it outwardly out of the path of the projections 57, when the rotary motion of the cane will be stopped and the cane held to the wheel by the band 18 so that the motion will be transmitted by the canes to the lower plate 15, from thence to the intermediate plate 16, shaft 20 and upper plate 14. After the projection has passed the stop lever 58, the lever will return to its normal position where it will remain until engaged by the next projection. When the next projection arrives at the stop lever the cane will have been brought to a position between the mold members and in contact with the roller 96 of the plate 9, so that the cane will be held out of contact with the wheel 11 and remain stationary in this position. The cane, having been previously heated will now be in position to be engaged by the mold members, which are brought into action by the cam 73 which actuates the vertical shaft 74 through the arm 76 and the truck roller 77. This movement of the vertical shaft 74 causes the arms 82, 83 to move the mold members 69, 70 toward each other through the links 84, 85. The position of the heated cane is such that the mold members will engage it and pinch a sufficient amount from the cane to form, in the present instance, a bead 86, as shown in Figures 4, 5 and 6. In order to form the bead with centrally located hole therethrough, the pin 88 is reciprocated by means of the arm 91 which is oscillated by the arm 82. The movement of this pin is so timed with respect to the movement of the mold members that the pin will simultaneously engage the cane with the closing of the mold members. As the mold members are separated by the further movement of the cam 73, the pin 88 will also be withdrawn from the now formed bead, and the bead allowed to fall from the members into the trough 95 which is inclined outwardly and downwardly so that the bead will pass by gravity away from the machine. At this time the cam 60 will again move the lever 58 outwardly, as above described, and the plate 15 rotated until the next projection 57 engages the stop lever. During the cycle of operation above described, the shaft 4 by its bevel gear 47 has rotated the shaft 49 through its bevel gear 48, a predetermined number of revolutions which by means of sprocket 51, chain 52 and flexible connection 29 has allowed the plate 14, carrying the canes, to be lowered a distance sufficient to compensate for the part of the cane removed.

Thus it will be understood from the foregoing that while each alternate cane is being heated, the adjacent canes are being acted upon by the molds, and at each progressive operation the delivery of the molded product is made.

Furthermore, if desired, I may embody in a single machine any number of burners and molds, thereby increasing the production without materially changing the mechanism controlling the operations.

It is obvious that various changes may be resorted to in the form, construction and arrangement of the several parts without departing from the spirit and scope of my invention; and hence I do not intend to be limited to the details herein shown and described, except as they may be specifically included in the claims.

What I claim is:

1. A machine of the character described comprising a vertically movable carrier for a heated glass cane, means for rotating said carrier, a mold having members adapted to move toward and away from the cane, and means for reciprocating said members to simultaneously form and cut the article from the cane.

2. A machine of the character described comprising a vertically movable carrier for a plurality of heated glass canes, means for rotating said carrier, molds having members adapted to move toward and away from the canes, and means for reciprocating said members to simultaneously form and cut the articles from the canes.

3. A machine of the character described comprising a vertically movable carrier for a heated glass cane, means for intermittently rotating said carrier, a mold having members adapted to move toward and away from the cane, and means for reciprocating said members to simultaneously form and cut the article from the cane.

4. A machine of the character described comprising a vertically movable carrier for a plurality of heated glass canes, means for intermittently rotating said carrier, molds having members adapted to move toward and away from the canes, and means for reciprocating said members to simultaneously form and cut the articles from the canes.

5. A machine of the character described comprising a vertically movable carrier for a heated glass cane, means for intermittently rotating said carrier, a mold having members adapted to move toward and away from the cane, means for reciprocating said members to simultaneously form and cut the article from the cane, and means for moving the carrier downwardly to feed the cane.

6. A machine of the character described comprising a vertically movable carrier for a plurality of heated glass canes, means for intermittently rotating said carrier, molds having members adapted to move toward and away from the canes, means for reciprocating said members to simultaneously form and cut the articles from the canes, and means for moving the carrier downwardly to feed the canes.

7. A machine of the character described comprising a vertically movable carrier for a heated glass cane, a mold having members adapted to move toward and away from the cane, and means for reciprocating said members to form and cut the article from the cane.

8. A machine of the character described comprising a vertically movable carrier for a plurality of heated glass canes, molds having members adapted to move toward and away from the canes, and means for reciprocating said members to form and cut the articles from the canes.

In testimony that I claim the foregoing as my invention, I have signed my name this fourth day of May, 1920.

GUSTAVE A. LEIMAN.